(12) United States Patent
Chinthala et al.

(10) Patent No.: US 11,118,116 B2
(45) Date of Patent: Sep. 14, 2021

(54) FCC CATALYST ADDITIVE AND A PROCESS FOR PREPARATION THEREOF

(71) Applicant: Reliance Industries Limited, Maharashtra (IN)

(72) Inventors: Praveen Kumar Chinthala, Andhra Pradesh (IN); Gopal Ravichandran, Tamil Nadu (IN); Tejas Dineshbhai Doshi, Gujarat (IN); Ankit Vipinkumar Patel, Gujarat (IN); Vinodh Rayan, Gujarat (IN); Sukumar Mandal, Haryana (IN); Asit Kumar Das, Gujarat (IN)

(73) Assignee: Reliance Industries Limited, Maharashtra (IN)

( * ) Notice: Subject to any disclaimer, the term of this patent is extended or adjusted under 35 U.S.C. 154(b) by 124 days.

(21) Appl. No.: 16/499,472

(22) PCT Filed: Mar. 30, 2018

(86) PCT No.: PCT/IB2018/052227
§ 371 (c)(1),
(2) Date: Sep. 30, 2019

(87) PCT Pub. No.: WO2018/189616
PCT Pub. Date: Oct. 18, 2018

(65) Prior Publication Data
US 2020/0071623 A1 Mar. 5, 2020

(30) Foreign Application Priority Data
Apr. 10, 2017 (IN) .............................. 201621039338

(51) Int. Cl.
*C10G 11/05* (2006.01)
*B01J 29/40* (2006.01)
*B01J 37/00* (2006.01)

(52) U.S. Cl.
CPC ............. *C10G 11/05* (2013.01); *B01J 29/405* (2013.01); *B01J 37/0045* (2013.01); *B01J 2229/42* (2013.01); *C10G 2300/104* (2013.01); *C10G 2300/1011* (2013.01); *C10G 2300/1044* (2013.01); *C10G 2300/1074* (2013.01); *C10G 2300/1081* (2013.01); *C10G 2400/20* (2013.01); *C10G 2400/28* (2013.01)

(58) Field of Classification Search
CPC ......... C10G 11/02; C10G 11/05; C10G 11/18; B01J 29/405; B01J 2229/186; B01J 2229/20; B01J 2229/42
See application file for complete search history.

(56) References Cited

U.S. PATENT DOCUMENTS

| | | |
|---|---|---|
| 4,816,135 A | 3/1989 | Martinez et al. |
| 2005/0232839 A1 | 10/2005 | Yaluris et al. |
| 2007/0209969 A1* | 9/2007 | Shen ........................ B01J 29/80 208/133 |
| 2007/0293714 A1 | 12/2007 | Long et al. |
| 2013/0023710 A1* | 1/2013 | Ravichandran ........ C10G 11/18 585/639 |

FOREIGN PATENT DOCUMENTS

WO 2013/011517 A1 1/2013

OTHER PUBLICATIONS

International Search Report in PCT/IB2018/052227, dated Jul. 6, 2018.

\* cited by examiner

*Primary Examiner* — Renee Robinson
(74) *Attorney, Agent, or Firm* — Collard & Roe, P.C.

(57) ABSTRACT

The present disclosure relates to an FCC catalyst additive for cracking of petroleum feedstock and a process for its preparation. The FCC catalyst additive of the present disclosure comprises at least one zeolite, at least one clay, at least one binder, phosphorous in the form of $P_2O_5$, and at least one Group IVB metal compound. The FCC catalyst additive of the present disclosure is hydrothermally stable and has improved matrix surface area even after various hydrothermal treatments. The FCC catalyst additive of the present disclosure can be used in combination with the conventional FCC catalyst for catalytic cracking to selectively enhance the propylene and LPG yields.

14 Claims, No Drawings

FCC CATALYST ADDITIVE AND A PROCESS FOR PREPARATION THEREOF

FIELD

The present disclosure relates to an FCC catalyst additive for cracking of petroleum feedstock and a process for its preparation.

BACKGROUND

Fluid catalytic cracking (FCC) is a widely employed conversion process in petroleum refineries. The global demand for light hydrocarbons such as gasoline, propylene, liquid petroleum gas (LPG) is growing exponentially. FCC catalysts are particularly employed to crack or convert hydrocarbons having high boiling point and/or high molecular weight to produce more valuable products.

High molecular weight hydrocarbon feed molecules cannot readily diffuse into zeolite pores. The catalyst matrix is capable of cracking large molecules which cannot readily diffuse into zeolite pores, resulting in fragments that are small enough to enter the zeolite pores. Thus, the catalyst matrix makes a major contribution in upgrading bottoms to light cycle oil and gasoline. Similarly, additive (ZSM-5 based) matrix contributes in cracking gasoline range hydrocarbon molecules followed by cracking with the help of ZSM-5 to produce lower olefins (Ethylene, propylene and LPG).

However, hydrothermal stability of zeolites is a major concern in FCC processes. Each regeneration step results into partial deactivation of the catalyst and/or additive. Preventing or minimizing deactivation of the catalyst and/or additive is a matter of continuous interest in the field of FCC applications.

Therefore, there is felt a need to develop an FCC catalyst additive system having a hydrothermally stable structure and a high matrix surface area, which meets the requirement of propylene and LPG production.

OBJECTS

Some of the objects of the present disclosure, which at least one embodiment herein satisfies, are as follows:

An object of the present disclosure is to provide an FCC catalyst additive.

Another object of the present disclosure is to provide an FCC catalyst additive with improved matrix surface area and hydrothermally stable structure.

Still another object of the present disclosure is to provide an FCC catalyst additive, which in combination with an FCC catalyst provides higher yields of propylene and LPG.

Yet another object of the present disclosure is to provide a process for the preparation of an FCC catalyst additive.

Other objects and advantages of the present disclosure will be more apparent from the following description, which is not intended to limit the scope of the present disclosure.

SUMMARY

In accordance with one aspect of the present disclosure, there is provided an FCC catalyst additive comprising (i) at least one zeolite in an amount in the range of 30 to 50 wt %, (ii) at least one clay in an amount in the range of 5 to 40 wt %, (iii) at least one binder in an amount in the range of 5 to 20 wt %, (iv) phosphorous pentoxide ($P_2O_5$) in an amount in the range of 5 to 10 wt %, and (v) at least one Group IVB metal compound in an amount in the range of 0.1 to 10 wt %.

In accordance with another aspect of the present disclosure, there is provided a process for preparing the FCC catalyst additive. The process comprises the following steps:

Initially, water and at least one zeolite and optionally, at least one dispersant are mixed under stirring to obtain an aqueous slurry. The aqueous slurry is subjected to ball milling to obtain consistent ball milled slurry. The so obtained ball milled slurry is admixed with an aqueous solution of at least one phosphorus containing compound selected from the group consisting of phosphoric acid, monoammonium dihydrogen phosphate, and diammonium hydrogen phosphate to obtain a first admixture. The first admixture is allowed to age to obtain an aged admixture.

In the second step, a clay slurry, and a binder slurry are independently prepared by mixing, at least one clay with a first fluid medium, at least one binder with a second fluid medium and a group IV B metal compound respectively. The aged admixture is then mixed with the clay slurry, and the binder slurry to obtain a second admixture having pH in the range of 5 to 9. The second admixture is spray dried, followed by calcination to obtain the FCC catalyst additive.

In accordance with still another aspect of the present disclosure, there is provided a process for cracking a hydrocarbon feed using an FCC catalyst additive of the present disclosure along with an FCC catalyst to produce enhanced propylene and LPG yields. The hydrocarbon feed comprises C5-C12 naphtha, C4-C6 paraffin, gas oil, vacuum gas oil (VGO), hydrotreated VGO, oil residue, slurry oil, heavy crude, biomass, waste plastic.

DETAILED DESCRIPTION

The global demand for light hydrocarbons such as gasoline, propylene, liquid petroleum gas (LPG) is growing exponentially. However, the propylene and LPG yields are limited by the process, and FCC catalyst and the FCC catalyst additive compositions.

The present disclosure envisages an FCC catalyst additive having a hydrothermally stable structure and a high matrix surface area. The FCC catalyst additive of the present disclosure along with the FCC catalyst is capable of enhancing the propylene and LPG production.

In a first aspect, the present disclosure provides an FCC catalyst additive. The FCC catalyst additive of the present disclosure comprises (i) at least one zeolite in an amount in the range of 30 to 50 wt %, (ii) at least one clay in an amount in the range of 5 to 40 wt %, (iii) at least one binder in an amount in the range of 5 to 20 wt %, (iv) phosphorous pentoxide ($P_2O_5$) in an amount in the range of 5 to 10 wt %, and (v) at least one Group IVB metal compound in an amount in the range of 0.1 to 10 wt %.

The zeolite is at least one selected from the group consisting of ZSM-5, ZSM-11, and ZSM-22. In accordance with an exemplary embodiment of the present disclosure, the zeolite is ZSM-5 in an amount in the range of 40 to 50 wt %. The zeolite used in the process of the present disclosure has silica to alumina ratio in the range of 20 to 40.

The clay is at least one selected from the group consisting of kaolin clay, halloysite, bentonite and mixtures thereof. In accordance with an exemplary embodiment of the present disclosure, the clay is kaolin clay in an amount in the range of 10 to 20 wt %.

The binder is at least one selected from the group consisting of colloidal silica, colloidal alumina, pseudoboehmite alumina, bayrite alumina, and gamma alumina. In accordance with an exemplary embodiment of the present disclosure, the binder is silica 5 in an amount in the range of 15 to 18 wt %.

The phosphorous containing compound is at least one selected from the group consisting of phosphoric acid, monoammonium dihydrogen phosphate, and diammonium hydrogen phosphate.

The Group IVB metal compound is at least one selected from the group consists of titanium oxide and zirconium oxide, preferably titanium oxide ($TiO_2$) 5 in an amount in the range of 1 to 5 wt %.

$TiO_2$ possesses good mechanical resistance and stability in acidic and oxidative environments. Incorporation of titanium in combination with phosphorous effectively stabilizes zeolite structure and facilitates higher matrix surface area, resulting in enhanced propylene yields.

In accordance with the embodiments of the present disclosure, the FCC catalyst additive comprises ZSM-5 in an amount in the range of 40 to 50 wt %; kaolin in an amount in the range of 10 to 20 wt %; colloidal silica in an amount in the range of 15 to 18 wt %; $P_2O_5$ in an amount in the range of 9 to 10 wt %; and titanium (Ti) compound in an amount in the range of 1 to 5 wt %.

In accordance with the present disclosure, the matrix surface area of the additive is in the range of 60 $m^2$/g to 100 $m^2$/g.

In accordance with another aspect of the present disclosure, there is provided a process for preparing the FCC catalyst additive. The process for preparing the FCC catalyst additive comprises the steps, which are described herein below.

An aqueous slurry containing at least one zeolite is prepared by mixing predetermined amounts of at least one zeolite, water and, optionally at least one dispersant under stirring. The dispersant used in the process of the present disclosure is at least one selected from the group consisting of sodium hexameta phosphate, sodium pyrophosphate, poly acrylic acid and their derivatives. The aqueous slurry is subjected to ball milling to obtain consistent ball milled slurry. An aqueous solution of at least one phosphorus containing compound is added to the consistent ball milled slurry to obtain a first admixture. The phosphorus containing compound is at least one selected from the group consisting of phosphoric acid, monoammonium dihydrogen phosphate, and diammonium hydrogen phosphate. The aqueous solution of the phosphorus containing compound is prepared by mixing predetermined amounts of the phosphorus containing compound with water. The first admixture so obtained is allowed to age for a time period in the range of 0.5 to 5 hours to obtain an aged admixture.

Next, at least one clay is mixed with a first fluid medium to obtain clay slurry. Similarly, at least one binder is mixed with a second fluid medium and a group IV B metal compound to obtain a binder slurry. The aged admixture, the clay slurry, and the binder slurry are mixed to obtain a second admixture having pH in the range of 5 to 9. The so obtained second admixture is spray dried followed by calcination at a temperature in the range of 400 to 800° C. to obtain the FCC catalyst additive.

The first fluid medium can be demineralized (DM) water. The second fluid medium can be at least one selected from the group consisting of demineralized (DM) water, formic acid, acetic acid, nitric acid and mixtures thereof.

The group IV B metal compound can be titanium oxide ($TiO_2$) and is added to the binder slurry in the form of an aqueous titania solution comprising a suspension of $TiO_2$ having the crystal size in the range of 10 nm to 30 nm (measured by XRD).

The present disclosure further provides a process for cracking a hydrocarbon feed using an FCC catalyst additive of the present disclosure and an FCC catalyst under cracking conditions to produce cracked hydrocarbons with enhanced propylene and LPG yields. The hydrocarbon feed comprises C5-C12 naphtha, C4-C6 paraffin, vacuum gas oil (VGO), hydrotreated VGO, slurry oil, heavy crude, biomass, waste plastic.

It is observed that the FCC catalyst additive containing predetermined amounts of phosphorous and the group IV B compound retains most of its physical properties such as surface area, pore volume, relative crystallinity (%) even after subjecting to severe hydrothermal deactivations. The FCC catalyst additive of the present disclosure exhibits superior performance in the form of higher propylene yields in comparison to additives that do not contain group IV B metal compound. The use of group IV B metal compound in the additive results in higher gasoline cracking, and thereby higher propylene and LPG yields, irrespective of the severity of the hydrothermal deactivation.

The process of the present disclosure utilizes the synergic effect of phosphate and binders resulting in zeolite-phosphorous stabilization in the presence of Group IV B metal compound. The incorporation of Group IV B metal compound into the catalyst additive results in higher matrix surface area and thereby better diffusion of hydrocarbon molecules and higher cracking activity with improved propylene and LPG yields in fluid catalytic cracking.

The present disclosure is further described in light of the following experiments which are set forth for illustration purpose only and are not to be construed for limiting the scope of the disclosure. The following experiments can be scaled up to industrial/commercial scale and the results obtained can be extrapolated to industrial scale.

EXPERIMENTAL DETAILS

Experiment 1: Process for Preparing FCC Catalyst Additive 1 (without Group IV B Metal Compound)

A ZSM-5, and sodium hexameta phosphate (dispersant) were mixed with demineralized (DM) water to produce an aqueous slurry of zeolite. The aqueous slurry of zeolite was subjected to ball milling to produce consistent ball milled slurry. Similarly, di ammonium hydrogen phosphate was mixed with demineralized (DM) water to produce phosphate slurry. The ball milled zeolite slurry was mixed with phosphate slurry to obtain a first admixture. The first admixture was aged for 3 hours to prepare aged admixture.

Kaolin clay was mixed with DM water and dispersant to prepare clay slurry. Colloidal silica was mixed with water and acidified to obtain binder slurry. The aged admixture of zeolite-phosphate slurry, the clay slurry, and the binder slurry were admixed to obtain a second admixture having pH 7. The second admixture was spray dried and calcined at 450° C. for 1 hour to obtain the additive 1.

Experiment 1 was performed for comparative purpose to produce additive 1, in which Group IV B metal compound is not added during preparation.

The alumina, phosphorous, sodium and titanium contents of additive 1 are measured by ICP analysis, which is provided in Table 1 given below.

Experiments 2 to 4: Process for Preparing FCC Catalyst Additives 2-4 (with Group IV B Metal Compound)

ZSM-5, and sodium hexameta phosphate (dispersant) were mixed with demineralized (DM) water to produce an aqueous slurry of zeolite. The aqueous slurry of zeolite was subjected to ball milling to produce consistent ball milled slurry. Similarly, di ammonium hydrogen phosphate was mixed with demineralized (DM) water to produce phosphate slurry. The ball milled zeolite slurry was mixed with phosphate slurry to obtain a first admixture. The first admixture was aged for 3 hours to prepare aged admixture.

Kaolin clay was mixed with water to prepare clay slurry. Colloidal silica was mixed with water followed by $TiO_2$ solution to obtain binder slurry. The titania solution contains 11.5 nm crystal (measured by XRD) of titania. The aged first admixture (Zeolite-phosphate slurry), the clay slurry, binder slurry containing group IV B metal compound were admixed to obtain a second admixture having pH 7.

The second admixture was spray dried and calcined at 450° C. for 1 hour to obtain additive 2.

Additive 3 and additive 4 were prepared following the same experimental procedure as disclosed above, except concentration of $TiO_2$.

The alumina, phosphorous, sodium and titanium contents of additives 2 to 4 are measured by ICP analysis, which is provided in Table 1 given below.

TABLE 1

ICP analysis of the additives 1 to 4

| | Experiments | | | |
|---|---|---|---|---|
| | 1 | 2 | 3 | 4 |
| | Additive ID | | | |
| | Additive-1 (Comparative Example) | Additive-2 | Additive-3 | Additive-4 |
| $Al_2O_3$ (wt %) | 18.57 | 17.76 | 16.57 | 16.40 |
| $P_2O_5$ (wt %) | 9.19 | 9.51 | 9.68 | 9.71 |
| $Na_2O$ (wt %) | 0.17 | 0.18 | 0.19 | 0.20 |
| $TiO_2$ (wt %) | 0.35* | 1.03 | 3.31 | 4.97 |
| $Crystal size of TiO_2$, nm | NA | 11.5 | 11.5 | 11.5 |

*$TiO_2$ is impurity from kaolin clay.

The FCC catalyst additive of experiment 1 (Additive 1) contains a small amount of $TiO_2$ and it is attributed to the impurity from kaolin clay and no $TiO_2$ solution was added in Additive 1 composition. The crystal size of $TiO_2$ used in experiments 2 to 4 was 11.5 nm. The zeolite content in additives 1-4 is 40 wt %.

Additives 1-4 were used for measuring the physical properties namely surface area (SA), average particle size (APS), apparent bulk density (ABD), and attrition index (AI) as per ASTM D5757.

In order to evaluate the FCC performance, additives 1 to 4 were subjected to simulated conditions of steam treatment at the laboratory scale. The simulated condition of the steam treatment at laboratory scale includes steaming of the additive at a temperature of 800° C. for 20 hours, 40 hours and 100 hours using 100% steam at atmospheric pressure.

These experiments illustrate the effect of use of titania on the hydrothermal stability of the respective catalyst additive. The physical properties of the catalyst additives 1 to 4 after 20 hours, 40 hours, and 100 hours are shown in Table 2, Table 3 and Table 4 respectively.

TABLE 2

Physical properties of the FCC catalyst additives after calcination and 20 hours of simulated condition

| | additive | | | |
|---|---|---|---|---|
| Properties | Additive 1 | Additive 2 | Additive 3 | Additive 4 |
| Calcined additive samples | | | | |
| TSA (F), $m^2/g$ | 111 | 137 | 131 | 123 |
| ZSA (F), $m^2/g$ | 82 | 97 | 88 | 93 |
| MSA (F), $m^2/g$ | 31 | 40 | 43 | 30 |
| TPV, cc/g | 0.08 | 0.1 | 0.12 | 0.079 |
| ABD, g/cc | 0.81 | 0.77 | 0.76 | 0.70 |
| APS, (μ) | 80 | 87 | 90 | 92 |
| Attrition Index (AI) | 6 | 8 | 10 | 14 |
| Crystallinity, % | 33 | 34 | 35 | 33 |
| Hydrothermally deactivated samples (20 hrs) | | | | |
| TSA (S), $m^2/g$ | 141 | 153 | 161 | 144 |
| ZSA (S), $m^2/g$ | 78 | 85 | 85 | 83 |
| MSA (S), $m^2/g$ | 63 | 68 | 76 | 61 |
| TPV, cc/g | 0.1 | 0.1 | 0.107 | 0.083 |
| Crystallinity, % | 30 | 33 | 31 | 29 |

TSA: Total surface area,
ZSA: Zeolite surface area,
MSA: matrix surface area,
TPV: total pore volume,
APS: average particle size,
ABD: apparent bulk density,
AI: attrition index

TABLE 3

Physical properties of the catalyst additives after calcination and 40 hours of simulated condition

| | additive | | |
|---|---|---|---|
| Properties | Additive 1 | Additive 3 | Additive 4 |
| Calcined additive samples | | | |
| TSA (F), $m^2/g$ | 111 | 131 | 123 |
| ZSA (F), $m^2/g$ | 82 | 88 | 93 |
| MSA (F), $m^2/g$ | 31 | 43 | 30 |
| TPV, cc/g | 0.08 | 0.12 | 0.079 |
| ABD, g/cc | 0.81 | 0.76 | 0.70 |
| APS, (μ) | 80 | 90 | 92 |
| Attrition Index (AI) | 6 | 10 | 14 |
| Crystallinity, % | 33 | 35 | 33 |
| Hydrothermally deactivated samples (20 hrs) | | | |
| TSA (S), $m^2/g$ | 143 | 167 | 158 |
| ZSA (S), $m^2/g$ | 78 | 61 | 80 |
| MSA (S), $m^2/g$ | 65 | 106 | 78 |
| TPV, cc/g | 0.1 | 0.12 | 0.09 |
| Crystallinity, % | 29 | 33 | 33 |

TSA: Total surface area,
ZSA: Zeolite surface area,
MSA: matrix surface area,
TPV: total pore volume,
APS: average particle size,
ABD: apparent bulk density,
AI: attrition index

TABLE 4

Physical properties of the catalyst additives
after 100 hours of simulated condition

| Properties | Additive 1 | Additive 3 | Additive 4 |
|---|---|---|---|
| Calcined additive samples | | | |
| TSA (F), m²/g | 111 | 131 | 123 |
| ZSA (F), m²/g | 82 | 88 | 93 |
| MSA (F), m²/g | 31 | 43 | 30 |
| TPV, cc/g | 0.08 | 0.12 | 0.079 |
| ABD, g/cc | 0.81 | 0.76 | 0.70 |
| APS, (μ) | 80 | 90 | 92 |
| Attrition Index (AI) | 6 | 10 | 14 |
| Crystallinity, % | 33 | 35 | 33 |
| Hydrothermally deactivated samples (100 hrs) | | | |
| TSA (S), m²/g | 146 | 166 | 154 |
| ZSA (S), m²/g | 51 | 74 | 75 |
| MSA (S), m²/g | 95 | 92 | 79 |
| TPV (S), cc/g | 0.1 | 0.1 | 0.09 |
| Crystallinity, % | 30 | 30 | 27 |

TSA: Total surface area,
ZSA: Zeolite surface area,
MSA: matrix surface area,
TPV: total pore volume,
APS: average particle size,
ABD: apparent bulk density,
AI: attrition index From the data tabulated in Table 2, Table 3 and Table 4, it is evident that the FCC catalyst additives containing $TiO_2$ retain most of their physical properties such as surface area, pore volume, relative crystallinity (%) after subjecting the respective additives prior to and after hydrothermal deactivations.

Experiment 5: Process for Preparing FCC Catalyst Additives 5 (with Higher Crystal Size Group IV B Metal Compound)

Similar experimental procedure was followed as described in experiments 2-4, except the added titania solution contains 22.9 nm crystal (measured by XRD) of titania.

Experiments 6-7: Process for Preparing FCC Catalyst Additives 6-7 (Higher Zeolite Content)

Similar experimental procedure was followed as described in experiment 2-4, except the zeolite content of the FCC catalyst additive is higher. Further, titania solution was not added in the experiment 6.

The alumina, phosphorous, sodium and titanium contents of additives II to IV are measured by ICP analysis. ICP analysis of the FCC catalyst additives prepared in experiments 5 to 7 are summarized below in Table-5.

TABLE 5

ICP analysis of the FCC catalyst additives 5 to 7

| | Experiments | | | |
|---|---|---|---|---|
| | 1 | 5 | 6 | 7 |
| | Additive ID | | | |
| | Additive-1 (Comparative Example) | Additive-5 | Additive-6 | Additive-7 |
| $Al_2O_3$ (wt %) | 18.57 | 16.42 | 15.41 | 14.7 |
| $P_2O_5$ (wt %) | 9.19 | 9.75 | 8.72 | 8.91 |
| $Na_2O$ (wt %) | 0.17 | 0.18 | 0.21 | 0.20 |
| $TiO_2$ (wt %) | 0.35* | 3.27 | 0.26* | 3.07 |
| $Crystal size of $TiO_2$, nm | NA | 22.9 | NA | 11.5 |

*$TiO_2$ is impurity from kaolin clay.

The FCC catalyst additive of experiment 6 (Additive 6) contains a small amount of $TiO_2$ and it is attributed to the impurity from kaolin clay and no $TiO_2$ solution was added in Additive 6 composition. The crystal size of $TiO_2$ in experiment 5 was increased to 22.9 nm, whereas the crystal size of $TiO_2$ in experiment 7 was 11.5 nm. The zeolite content in experiments 6-7 was increased to 50 wt %.

Additives 5-7 also used for measuring the physical properties namely surface area (SA), average particle size (APS), apparent bulk density (ABD), and attrition index (AI) as per ASTM D5757.

In order to evaluate the FCC performance, additives 5 to 7 were subjected to simulated conditions of steam treatment at the laboratory scale. The simulated condition of the steam treatment at laboratory scale includes steaming of the additive at a temperature of 800° C. for 20 hours, 40 hours and 100 hours using 100% steam at atmospheric pressure.

These experiments illustrate the effect of use of titania on the hydrothermal stability of the respective catalyst additive. The physical properties of the catalyst additives 5 to 7 after 40 hours are shown in Table 6.

TABLE 6

Physical properties of the catalyst additives after
calcination and 40 hours of simulated condition

| Properties | Additive 1 | Additive 5 | Additive 6 | Additive 7 |
|---|---|---|---|---|
| Calcined additive samples | | | | |
| TSA (F), m²/g | 111 | 131 | 170 | 154 |
| ZSA (F), m²/g | 82 | 85 | 115 | 106 |
| MSA (F), m²/g | 31 | 46 | 55 | 48 |
| TPV, cc/g | 0.08 | 0.12 | 0.10 | 0.12 |
| ABD, g/cc | 0.81 | 0.76 | 0.78 | 0.78 |
| APS, (μ) | 80 | 92 | 94 | 96 |
| Attrition Index (AI) | 6 | 9 | 6 | 8 |
| Crystallinity, % | 33 | 34 | 45 | 46 |
| Hydrothermally deactivated samples (40 hr) | | | | |
| TSA (S), m²/g | 146 | 176 | 181 | 187 |
| ZSA (S), m²/g | 78 | 83 | 98 | 93 |
| MSA (S), m²/g | 65 | 93 | 83 | 94 |
| TPV, cc/g | 0.1 | 0.12 | 0.11 | 0.12 |
| Crystallinity, % | 29 | 31 | 41 | 42 |

TSA: Total surface area,
ZSA: Zeolite surface area,
MSA: matrix surface area,
TPV: total pore volume,
APS: average particle size,
ABD: apparent bulk density,
AI: attrition index From the data tabulated in Table 6, it is evident that the FCC catalyst additives containing $TiO_2$ retain most of their physical properties such as surface area, pore volume, relative crystallinity (%) after subjecting the respective additives prior to and after hydrothermal deactivations.

Experiment 8: FCC Cracking Using the Catalyst Additives 1-7

The FCC catalyst additives of experiments 1 to 7 (additives 1 to 7) were individually admixed with the Y zeolite based FCC catalyst and used for FCC cracking process.

The FCC catalyst additives 1 to 7 were hydrothermally deactivated at 800° C. for 20-100 hours using 100% steam at atmospheric pressure whereas, the main FCC catalyst (Y zeolite based) was deactivated at 800° C. for 20 hrs. An admixture of hydrothermally deactivated Y zeolite based FCC catalyst and the additive in a predetermined ratio (75:25) was loaded in fixed fluid bed ACE micro reactor. The micro reactor was electrically heated to maintain the catalyst bed temperature at 545° C. The hydro treated Vacuum Gas Oil (VGO) was injected in the fluidized bed for 30 seconds to generate the cracking data at various catalysts to oil ratios. The properties of VGO are shown in Table 7.

TABLE 7

The properties of the VGO (hydrotreated) feed:

| Properties | Values |
|---|---|
| VGO specific gravity | 0.907 |
| Viscosity (st 99° C.) | 6.8 cSt |
| Sulfur | 0.25 wt % |
| CCR (Contradson carbon Residue) | 0.12 wt % |
| Total Nitrogen | 800 ppm |
| UOP K | UOP K |
| Distillation (SIM D2887) in ° C. | |
| 5 wt % | 327 wt % |
| 10 wt % | 350 wt % |
| 30 wt % | 401 wt % |
| 50 wt % | 433 wt % |
| 70 wt % | 470 wt % |
| 90 wt % | 518 wt % |

VGO: vacuum gas oil

In order to evaluate the FCC performance, additives 1 to 7 were subjected to simulated conditions of severe hydrothermal deactivations. The simulated condition of steam treatment at laboratory scale included steaming of the additive at 800° C. for 20 hours, 40 hours and 100 hours using 100% steam at atmospheric pressure. The performance evaluation results of additives 1 to 7 are shown in Tables 8-11.

The product yields for Additives 1 to 4 at 76% conversion after 20 hours, 40 hours and 100 hours hydrothermal deactivations are compiled in Table 8, Table 9 and Table 10 respectively. The product yields for Additives 5 to 7 at 76% conversion after 40 hours hydrothermal deactivations are shown in Table 11.

TABLE 8

Product yields of an FCC process at 76% conversion after 20 hours hydrothermal deactivation of additives

| | Additive 1 | Additive 2 | Additive 3 | Additive 4 |
|---|---|---|---|---|
| C/O ratio | 6.1 | 5.4 | 5.7 | 5.7 |
| Coke | 4.0 | 4.0 | 4.0 | 4.2 |

TABLE 8-continued

Product yields of an FCC process at 76% conversion after 20 hours hydrothermal deactivation of additives

| | Additive 1 | Additive 2 | Additive 3 | Additive 4 |
|---|---|---|---|---|
| Fuel gas | 3.1 | 2.5 | 2.9 | 2.5 |
| Propylene | 12.5 | 12.8 | 13.5 | 13.0 |
| Gasoline | 37.8 | 37.7 | 36.1 | 36.7 |
| LCO | 16.4 | 16.5 | 16.4 | 16.2 |
| CSO | 7.6 | 7.5 | 7.6 | 7.8 |
| Total LPG | 31.1 | 31.9 | 33 | 32.6 |

LCO: Light Cycle oil,
CSO: clarified slurry oil

TABLE 9

Product yields of an FCC process at 76% conversion after 40 hours hydrothermal deactivation of additives

| | Additive 1 | Additive 3 | Additive 4 |
|---|---|---|---|
| C/O ratio | 5.5 | 5.7 | 5.4 |
| Coke | 4.2 | 4.3 | 4.3 |
| Fuel gas | 2.4 | 3.3 | 3.1 |
| Propylene | 12.0 | 12.8 | 12.4 |
| Gasoline | 39.4 | 34.6 | 35.5 |
| LCO | 16.6 | 16.6 | 16.4 |
| CSO | 7.4 | 7.4 | 7.6 |
| Total LPG | 30.1 | 33.9 | 33.2 |

TABLE 10

Product yields of an FCC process at 76% conversion after 100 hours hydrothermal deactivation of additives

| | Additive 1 | Additive 3 | Additive 4 |
|---|---|---|---|
| C/O ratio | 5.4 | 5.1 | 6.0 |
| Coke | 4.0 | 3.9 | 4.5 |
| Fuel gas | 2.8 | 3.3 | 2.7 |
| Propylene | 12.5 | 13.6 | 12.3 |
| Gasoline | 36.2 | 33.8 | 35.5 |
| LCO | 16.6 | 16.4 | 17.0 |
| CSO | 7.4 | 7.6 | 7.0 |
| Total LPG | 5.4 | 35.1 | 33.3 |

It is observed from Tables 8-10 that the FCC catalyst additives 2 to 4 exhibit higher performance and higher propylene yield in comparison to the FCC catalyst additive 1. The presence of Titania in the additives 2 to 4 leads to higher gasoline cracking, and thereby higher propylene and LPG yields. Further, the superior performance the FCC catalyst additives 2 to 4 is attributed to higher matrix surface area and better accessibility of the active sites.

TABLE 11

Product yields of an FCC process using additive 5-7 at 76% conversion after 40 hours hydrothermal deactivation of additives

| | Additive 1 | Additive 5 | Additive 6 | Additive 7 |
|---|---|---|---|---|
| C/O ratio | 5.5 | 6.8 | 5.8 | 5.6 |
| Coke | 4.2 | 4.6 | 4.2 | 4.4 |
| Fuel gas | 2.4 | 3.2 | 2.9 | 3.0 |
| Propylene | 12.0 | 12.7 | 13.1 | 13.7 |
| Gasoline | 39.4 | 35.6 | 36.4 | 34.7 |
| LCO | 16.6 | 17.4 | 16.8 | 16.7 |
| CSO | 7.4 | 6.6 | 7.2 | 7.3 |
| Total LPG | 30.1 | 32.7 | 32.5 | 33.9 |

It is observed from Table 11, that the FCC catalyst additives 5 having different titania crystals exhibited comparable performance. The higher zeolite containing catalyst additive 6 shows higher propylene yield as expected in comparison to the FCC catalyst additive 1. The presence of titania in additive 7 along with higher zeolite content further improves the gasoline cracking, and thereby higher propylene and LPG yields.

TECHNICAL ADVANCEMENTS

The present disclosure described herein above has several technical advantages including, but not limited to, the realization of an FCC catalyst additive and a process for preparation thereof, which
is hydrothermally stable; and
enhances propylene and LPG yields in FCC processes.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. An FCC catalyst additive comprising
   i. at least one zeolite in an amount in the range of 30 to 50 wt %;
   ii. at least one clay in an amount in the range of 5 to 40 wt %;
   iii. at least one binder in an amount in the range of 5 to 20 wt %;
   iv. $P_2O_5$ in an amount in the range of 5 to 10 wt %; and
   v. at least one Group IVB metal compound in an amount in the range of 0.1 to 10 wt %
   wherein a source of said Group IVB metal compound is an aqueous titania solution comprising a suspension of $TiO_2$ having the crystal size in the range of 10 nm to 30 nm.

2. The FCC catalyst additive as claimed in claim 1, wherein said zeolite is at least one selected from the group consisting of ZSM-5, ZSM-11, and ZSM-22 zeolite.

3. The FCC catalyst additive as claimed in claim 1, wherein said zeolite is ZSM-5 in an amount in the range of 40 to 50 wt %.

4. The FCC catalyst additive as claimed in claim 1, wherein said clay is at least one selected from the group consisting of kaolin clay, halloysite, bentonite and mixtures thereof.

5. The FCC catalyst additive as claimed in claim 1, wherein said binder is at least one selected from the group consisting of colloidal silica, colloidal alumina, pseduo-boehmite alumina, bayrite alumina, gamma alumina and mixtures thereof.

6. The FCC catalyst additive as claimed in claim 1, wherein said clay is kaolin clay in an amount in the range of 10 to 20 wt %; and said binder is colloidal silica in an amount in the range of 15 to 18 wt %.

7. The FCC catalyst additive as claimed in claim 1, wherein said Group IVB metal compound is $TiO_2$ in an amount in the range of 1 to 5 wt %.

8. The FCC catalyst additive as claimed in claim 1, wherein said zeolite is ZSM-5 in an amount in the range of 40 to 50 wt %; said clay is kaolin clay in an amount in the range of 15 to 20 wt %; said binder is colloidal silica in an amount in the range of 15 to 18 wt %; $P_2O_5$ in an amount in the range of 9 to 10 wt %; and said Group IVB metal compound is $TiO_2$ in an amount in the range of 1 to 5 wt %.

9. A process for preparing an FCC catalyst additive of claim 1, said process comprising the following steps:
   a. mixing water and at least one zeolite, and optionally, at least one dispersant under stirring to obtain an aqueous slurry;
   b. subjecting said aqueous slurry to ball milling to obtain a consistent ball milled slurry;
   c. admixing said ball milled slurry with an aqueous solution of at least one phosphorus containing compound selected from the group consisting of phosphoric acid, monoammonium dihydrogen phosphate, and diammonium hydrogen phosphate to obtain a first admixture;
   d. ageing said first admixture to obtain an aged admixture;
   e. independently mixing, at least one clay with a first fluid medium to obtain a clay slurry, and at least one binder with a second fluid medium and at least one group IV B metal compound to obtain a binder slurry;
   f. admixing said aged admixture, said clay slurry, and said binder slurry to obtain a second admixture having pH in the range of 5 to 9; and
   g. spray drying said second admixture followed by calcining to obtain the FCC catalyst additive;
   wherein said group IV B metal compound is in the form of an aqueous titania solution comprising a suspension of $TiO_2$ having the crystal size in the range of 10 nm to 30 nm.

10. The process as claimed in claim 9, wherein said dispersant is at least one selected from the group consisting of sodium hexameta phosphate, sodium pyrophosphate, poly acrylic acid and their derivatives, and mixtures thereof.

11. The process as claimed in claim 9, wherein said first fluid medium is demineralized (DM) water; and said second fluid medium is at least one selected from the group consisting of demineralized (DM) water, formic acid, acetic acid, nitric acid and mixtures thereof.

12. The process as claimed in claim 9, wherein the step of ageing of said first admixture is carried out for a time period in the range of 0.5 to 5 hours.

13. The process as claimed in claim 9, wherein the step of calcination is carried out at a temperature in the range of 400° C. to 800° C. for a time period in the range of 0.5 to 5 hours.

14. A process for cracking a hydrocarbon feed using an FCC catalyst additive and an FCC catalyst to produce cracked hydrocarbons with enhanced propylene and LPG yields; wherein said FCC catalyst additive comprises at least one zeolite in an amount in the range of 30 to 50 wt %; at least one clay in an amount in the range of 10 to 40 wt %; at least one binder in an amount in the range of 5 to 20 wt %; $P_2O_5$ in an amount in the range of 5 to 10 wt %; and at least one Group IVB metal compound in an amount in the range of 0.1 to 10 wt %, wherein a source of said Group IVB metal compound is an aqueous titania solution comprising a suspension of $TiO_2$ having the crystal size in the range of 10 nm to 30 nm; wherein said hydrocarbon feed comprises C5-C12 naphtha, C4-C6 paraffin, vacuum gas oil, slurry oil, heavy crude, biomass, or waste plastic.

* * * * *